United States Patent
Mitter

(10) Patent No.: US 10,452,031 B2
(45) Date of Patent: *Oct. 22, 2019

(54) AUTHENTICATION SYSTEM AND METHOD THEREOF

(71) Applicant: Navroop Pal Singh Mitter, Boyds, MD (US)

(72) Inventor: Navroop Pal Singh Mitter, Boyds, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 15/884,334

(22) Filed: Jan. 30, 2018

(65) Prior Publication Data

US 2018/0181082 A1    Jun. 28, 2018

Related U.S. Application Data

(63) Continuation of application No. 13/708,940, filed on Dec. 8, 2012, now Pat. No. 9,465,368.

(60) Provisional application No. 61/568,292, filed on Dec. 8, 2011.

(51) Int. Cl.
  *G05B 1/00*  (2006.01)
  *G06F 21/31*  (2013.01)
  *G06F 21/32*  (2013.01)

(52) U.S. Cl.
  CPC .............. *G05B 1/00* (2013.01); *G06F 21/316* (2013.01); *G06F 21/32* (2013.01)

(58) Field of Classification Search
  CPC combination set(s) only.
  See application file for complete search history.

(56) References Cited

U.S. PATENT DOCUMENTS

| | | | |
|---|---|---|---|
| 2002/0140542 A1* | 10/2002 | Prokoski | G06K 9/00885 340/5.52 |
| 2005/0030151 A1* | 2/2005 | Singh | B60R 25/1004 340/5.8 |
| 2005/0057339 A1 | 3/2005 | Ikehara et al. | |
| 2005/0275542 A1* | 12/2005 | Weekes | G08B 21/0286 340/573.1 |
| 2006/0161993 A1 | 7/2006 | Cvek | |
| 2006/0190836 A1 | 8/2006 | Ling-Su et al. | |
| 2008/0274765 A1* | 11/2008 | Lopez | G06F 8/60 455/552.1 |
| 2009/0219135 A1* | 9/2009 | Harvey | B60R 25/2018 340/5.82 |

(Continued)

*Primary Examiner* — Nabil H Syed
*Assistant Examiner* — Cal J Eustaquio
(74) *Attorney, Agent, or Firm* — Law Office of Jerry Joseph, PLC; Jerry K. Joseph

(57) ABSTRACT

A haptic-based identification, authentication, authorization, and context aware authorization system usable with a touch-enabled device having a touch screen haptic interface, touch-enabled device receiving a plurality of inputs during interaction with a user which includes a storage space to store a first plurality of inputs corresponding to an authenticated user and a central processing unit (CPU) in communication with the storage space and the touch-enabled device to compare the first plurality of inputs with a second plurality of inputs inputted by the user, wherein the CPU authenticates the user to the touch-enabled device when the inputted second plurality of inputs is determined to be similar to the first plurality of inputs.

34 Claims, 4 Drawing Sheets

(56) References Cited

U.S. PATENT DOCUMENTS

2009/0320106 A1\* 12/2009 Jones ................ G06Q 20/1085
726/5
2012/0306758 A1 12/2012 Mardsen et al.

\* cited by examiner

AUTHENTICATION SYSTEM AND METHOD THEREOF

BACKGROUND

1. Field of the Invention

The present inventive concept relates to security on electronic devices such as smart-phones, tablets, and other computing devices. More particularly, the present general inventive concept relates to enabling a novel haptic-based identification, authorization, and context-aware authorization system for enhanced security on electronic devices such as smart-phones, tablets, and other computing devices that support a touch screen, or a so called haptic interface, through the utilization of simultaneous, sequential, or combinations of simultaneous and sequential measurements from haptic-based biometric sensory inputs and various other sensors for the purposes of distinguishing and/or identifying known or unknown users.

2. Description of the Related Art

Several technologies currently exist for the provision of security on smart-phones, tablets, computing devices, and other like devices. For example, number-pad or key-pad entry, swipe or slide to open, voice recognition, and facial recognition have all been utilized for security purposes, however, each have short comings. That is, requiring a user to enter a pass code on a number pad to gain access to a device is cumbersome and time consuming, especially in the case of an emergency.

Devices protected by pass codes also suffer from security risks, such as simple social engineering, where a user is convinced to share their pass code, or to brute force attacks, where the device is subjected to a high number and volume of attempts. A simple swipe or slide to open function, while quick and easy, does not offer any protection to the device should an unauthorized user attempt to access the device.

Voice recognition technology offers increased protection to a device owner; however, the code must be transmitted aloud and is not only audible to bystanders but can suffer from interference from external noise. Utilizing facial recognition to grant access to a device offers enhanced security, however such a device requires a front facing camera, can be time consuming, awkward to implement especially in social settings, and furthermore can be easily bypassed.

BRIEF SUMMARY OF THE INVENTION

Aside from the above noted shortcomings in the related art, no current system provides for simultaneous, sequential, or combinations of simultaneous and sequential measurements from haptic-based biometric sensory inputs via a haptic interface or various other types of sensors to provide for an unprecedented simplification of identification, authorization, and/or context aware identification, authorization, or authentication of a user.

The present general inventive concept provides for a haptic-based identification system.

The present general inventive concept further provides for a haptic-based identification system having various haptic-based biometric sensory inputs for the purposes of authentication and authorization of a user.

The present general inventive concept further provides for haptic-based detection of changes or irregularities in a particular physiological state of the user, such as, but not limited to temperature, pulse, and capacitance, for providing context during authorization.

The present general inventive concept further provides a means for distinguishing between distinct known and/or unknown owners and/or users in single and multi-user scenarios leveraging a haptic-based identification system having various haptic-based biometric sensory inputs.

The present general inventive concept further provides for a haptic biometric signature-based tracking of all performed actions by known and/or unknown users of the device.

The present general inventive concept further provides for transmission of a haptic biometric signature for remote identification, authorization and context aware authorization in conjunction with, or without, the use of other various other identification mechanisms or information.

Additional aspects and utilities of the present general inventive concept will be set forth in part in the description which follows and, in part, will be obvious from the description, or may be learned by practice of the general inventive concept.

Features and/or utilities of the present general inventive concept provides a method of authenticating a user which includes receiving a first data corresponding to a manner in which the user uses a device, comparing a second data inputted by the user with the first data, and authenticating the user when the second data is similar to the first data.

The second data may correspond to a manner in which the user uses the first device.

The user may access the first device if authorized.

The user may access a second device if authorized, if the second device inherits the authentication from the first device.

The first device may include a touch screen device, a tablet, a smart phone device, a computer, and a network.

The first data may include device usage information or sensory input data.

The device usage information may include body temperature data, pressure data, time data, capacitance data, rhythm/cadence data of finger press, accelerometer data, geographic GPS data, device position data, and contact area data.

The second data may include a password, a phrase, or normal device usage mannerisms.

Features and/or utilities of the present general inventive concept also provides a haptic-based identification, authentication, authorization, and context aware authorization system usable with a touch-enabled device having a touch screen haptic interface, touch-enabled device receiving a plurality of inputs during interaction with a user which includes a storage space to store a first plurality of inputs corresponding to an authenticated user and a central processing unit (CPU) in communication with the storage space and the touch-enabled device to compare the first plurality of inputs with a second plurality of inputs inputted by the user, wherein the CPU authenticates the user to the touch-enabled device when the inputted second plurality of inputs is determined to be similar to the first plurality of inputs.

The CPU may allow access to the touch-enabled device or specific resource if authorized.

The plurality of inputs may further include data received from non-biometric sensors and wherein the CPU authenticates or authorizes the user depending on a comparison of the first plurality of inputs with the second plurality of inputs.

The first and second plurality of inputs may include biometric input data and sensory input data.

The first and second plurality of inputs may include biometric input data inputted by the authenticated user during interaction with the touch-enabled device.

The first and second plurality of inputs may include simultaneous, sequential or combinations of simultaneous and sequential measurements from the haptic-based biometric sensory inputs or the sensory input data.

The biometric input data may include body temperature data, pressure data, time data, capacitance data, rhythm/cadence data of finger press, accelerometer data, geographic GPS data, device position data, and contact area data.

The biometric input data may include a user's physiological state.

The CPU may authorize the user if the second plurality of inputs is similar to the first plurality of inputs and authorizes the user access to the touch-enabled device according to a degree of similarity between the first and second plurality of inputs.

Features and/or utilities of the present general inventive concept also provides a haptic-based identification, authentication, authorization, and context aware authorization system to be implemented on a touch-enabled device which includes a touch screen haptic interface, the touch screen haptic interface having means for providing various sensory inputs during interaction with a user, a central processing unit having means for communication with the haptic interface, the sensory inputs having means for obtaining and transmitting the user's biometric input data, a user authentication controller having means for receiving, storing, and analyzing sets of the biometric input data, means for transmitting the biometric input data to the user authentication controller, means for creating a registered haptic-based biometric signature based upon an authenticated user's biometric input data and means for comparing the biometric input data to the registered haptic-based biometric signature, wherein the touch enabled device is programmed to undertake actions based upon the results of the comparison between the biometric input data to the registered haptic-based biometric signature.

The sensory inputs may include haptic-based biometric sensory inputs.

The authentication controller may provide a plurality of levels of access to the touch enabled device based upon the comparison between the biometric input data to the registered haptic-based biometric signature.

The data sets may include simultaneous, sequential or combinations of simultaneous and sequential measurements from the haptic-based biometric sensory inputs.

The biometric input data may include body temperature data, pressure data, time data, capacitance data, rhythm/cadence data of finger press, accelerometer data, geographic GPS data, device position data, and contact area data.

The biometric input data may include a user's physiological state.

The authentication controller may provide a first level of access to the touch enabled device if the user's physiological state data within the biometric input data is similar to the user's physiological state data within the registered haptic-based biometric signature.

The authentication controller may provide a first level of access to the touch enabled device if the user is within a predefined region based on the GPS data.

The authentication controller may provide a second level of access to the touch enabled device if the user is outside the predefined region based on the GPS data.

Certain of the foregoing and related aspects are readily attained according to the present general inventive concept by incorporation of haptic sensory input to create a registered haptic biometric signature of the rightful owner(s) and/or user(s) of a device in order to prevent unauthorized access to the device or features within the device. However, the present general inventive concept is not limited thereto.

BRIEF DESCRIPTION OF THE DRAWINGS

The general inventive concept is further described in the detailed description that follows, by reference to the noted drawings by way of non-limiting illustrative exemplary embodiments of the general inventive concept, in which like reference numerals represent similar parts throughout the drawings. As should be understood, however, the general inventive concept is not limited to the precise arrangements and instrumentalities illustrated.

The term authorization refers to a concept of allowing a user access to resources such as a network, electronic device, or computer system. The term authentication refers to a process of verifying a claim made by a user that he/she should be treated as acting on behalf of a given principal, while authorization is the process of verifying that an authenticated user has the required authority to perform a particular operation. The term identification refers to the process by which an identity of a user is established, and authentication is the process by which a service confirms the claim of a user to use a specific identity by the use of credentials, such as passwords or certificates.

Figure 1:
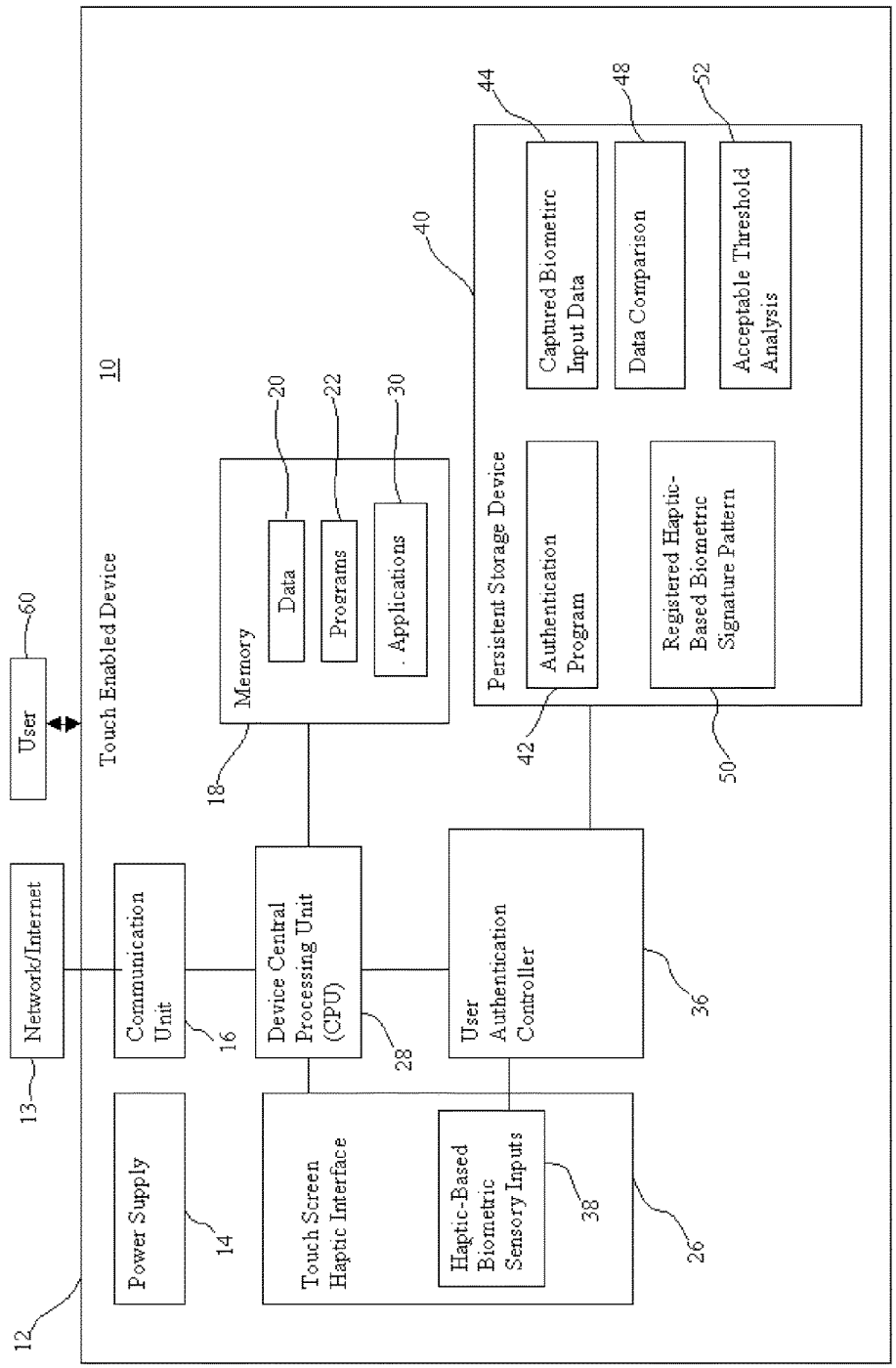
Figure 2:
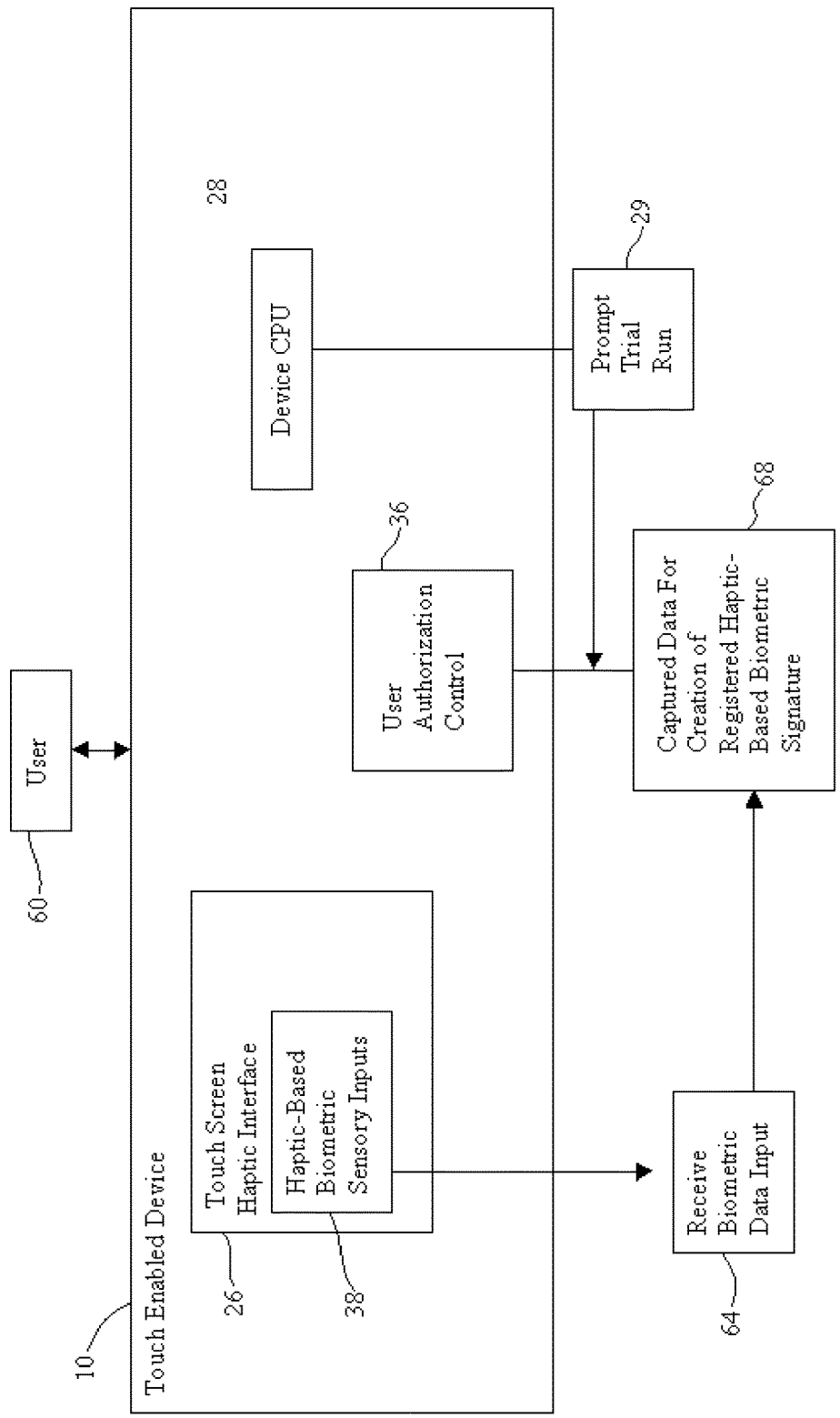
Figure 3:
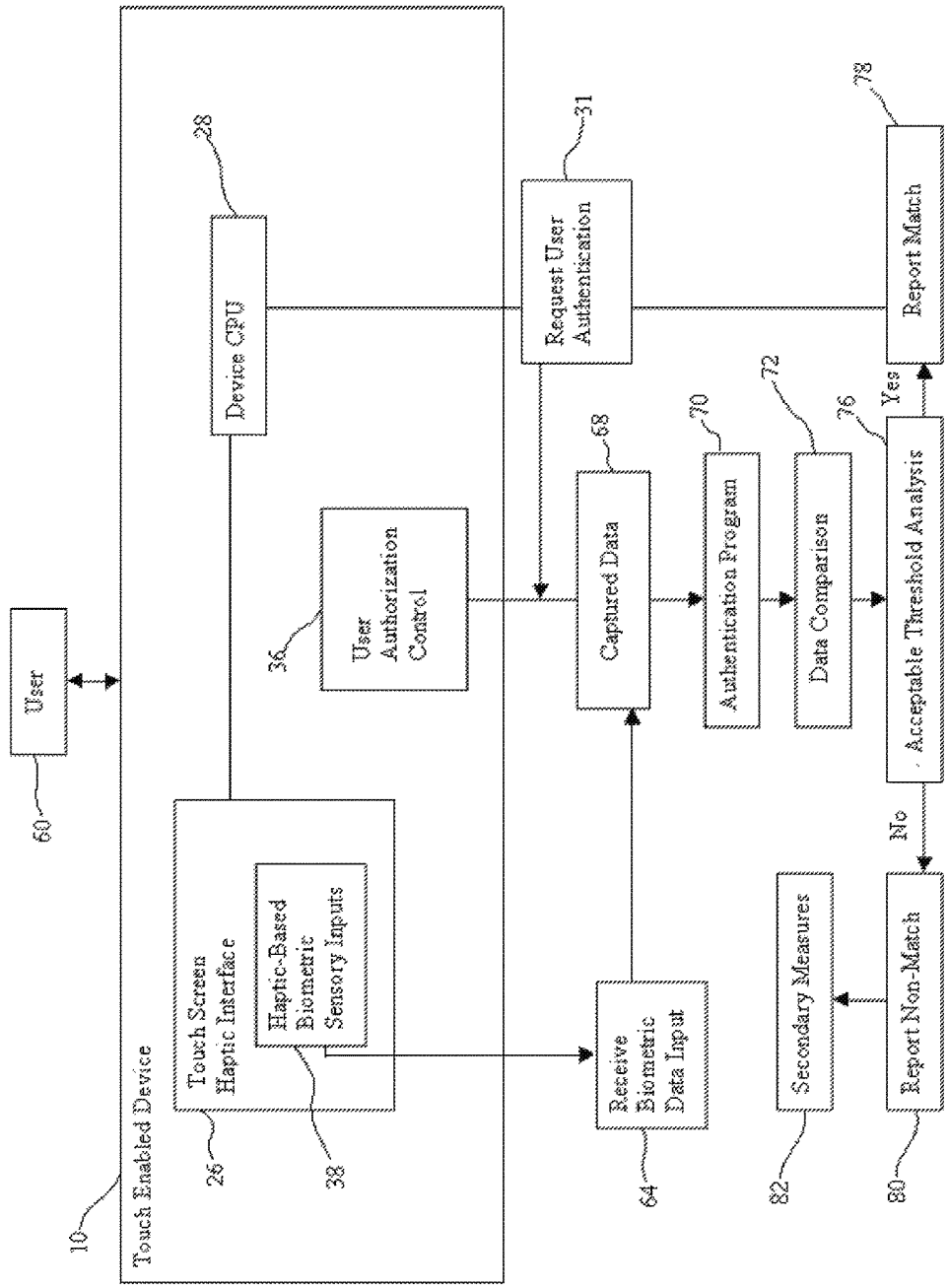
Figure 4:
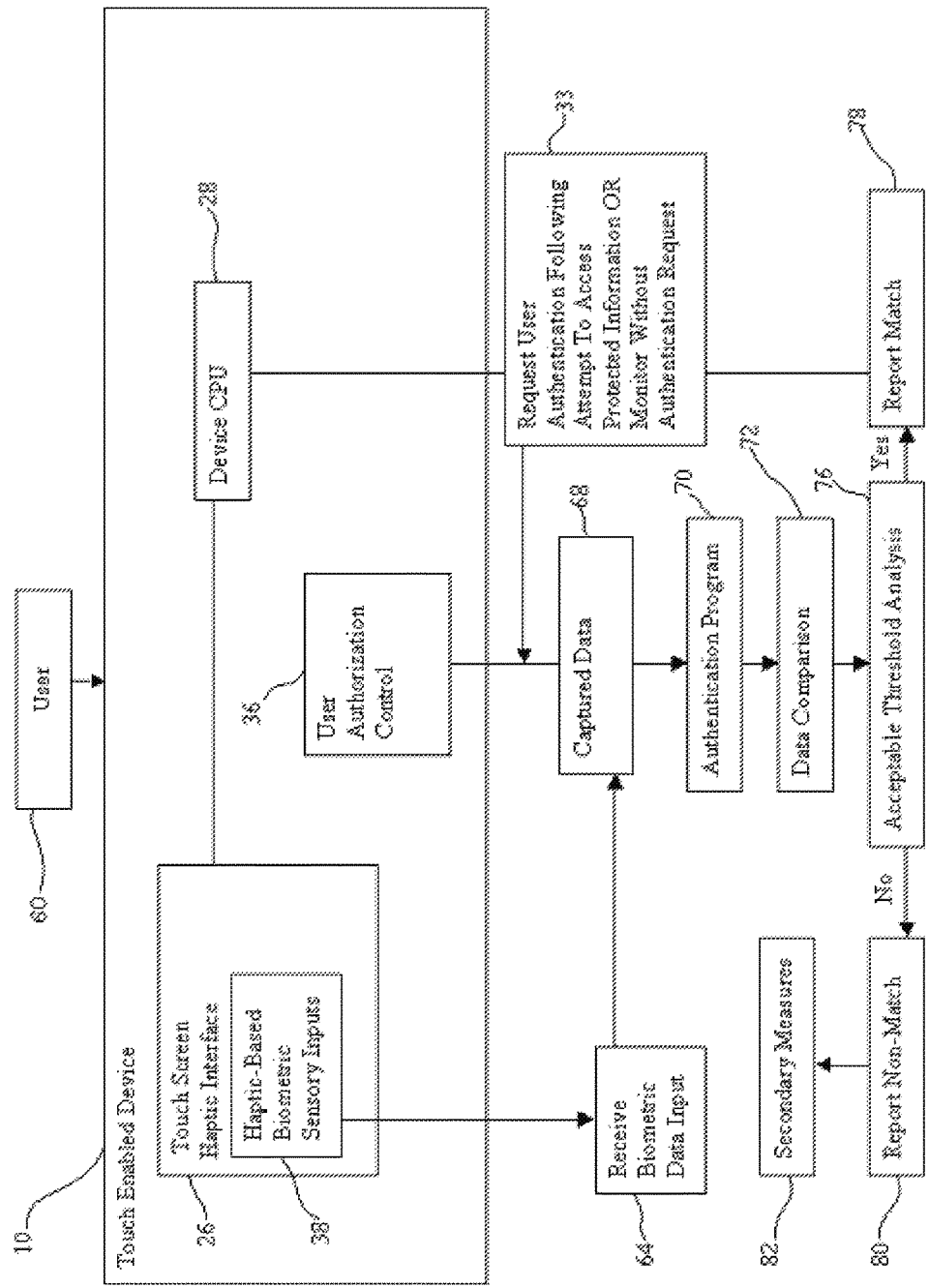

An exemplary embodiment of the present general inventive concept, which in no way limits the claims will now be more particularly described by way of example with reference to the accompanying drawings, wherein:

FIG. 1 is a block diagram illustrating a configuration of a touch-enabled device having a haptic-based identification system according to an exemplary embodiment of the present general inventive concept;

FIG. 2 is a sequence diagram illustrating a touch-enabled device equipped with the haptic-based identification system according to an exemplary embodiment of the present general inventive concept gathering baseline user-data for the creation of a registered signature;

FIG. 3 is a sequence diagram illustrating a touch-enabled device equipped with the haptic-based identification system according to an exemplary embodiment of the present general inventive concept requesting a user's authentication to access the device; and FIG. 4 is a sequence diagram illustrating a touch-enabled device equipped with the haptic-based identification system according to an exemplary embodiment of the present general inventive concept, request of a user's authentication following a user's attempt to access a protected area of a touch-enabled device.

DETAILED DESCRIPTION

Reference will now be made in detail to the exemplary embodiments of the present general inventive concept, examples of which are illustrated in the accompanying drawings, wherein like reference numerals refer to the like elements throughout. The exemplary embodiments are described below in order to explain the present general inventive concept by referring to the figures.

FIG. 1 is a block diagram illustrating a configuration of a touch enabled device 10 such as a smart-phones, tablets, or other computing device, equipped with a multi-dimensional haptic identification, authentication, and context aware system, herein referred to generally as haptic identification system 12 according to an exemplary embodiment of the present general inventive concept. A conventional touch screen has been modified by the inclusion of haptic-based biometric sensory inputs to serve as the touch screen haptic interface 26, simultaneously displaying information and providing operating elements, i.e., a touch pad with letters and numbers.

Touch enabled device 10 is operationally controlled by a central processing unit CPU 28 or controller via an interaction between information entered into the touch screen haptic interface 26 by a user 60, and the data 20, programs 22 and applications 30 stored in the memory 18 of the device 10. The CPU 28 or controller controls what information is displayed to a user 60 on the touch screen user interface 26, and what prompts will be provided when the device 10 is enabled or otherwise requested to perform a task by the user 60. CPU 28 works in concert with the communication unit 16 of the touch enabled device 10 to allow for a connection to a network/internet 13 via a wireless, or hard line connection.

In the normal operation of the touch enabled device 10, the touch screen user interface 26 is provided with at least a touch-activated screen lock to prevent accidental entry or activation of the device 10. The CPU 28 may prompt a user 60 to touch or swipe a certain area of the touch screen haptic interface 26, with an optional secondary or tertiary security backings, such as passwords or certificates, thereafter.

Haptic-based biometric sensory inputs 38 are provided to operate in connection with the touch screen haptic interface 26, including but not limited to, body temperature data, pressure data, time data, capacitance data, rhythm/cadence data of finger press, accelerometer data, geographic GPS data, device position data, and contact area data. In alternative exemplary embodiments, the haptic-based biometric sensory inputs 38 may receive inputs regarding an external environment, including but not limited to temperature and/or geographical location of the touch enabled device 10. Thus, when a user 60 interacts with the touch screen haptic interface 26 via a touch or swipe, haptic-based biometric sensory inputs 38 can record single, or multiple sets of data, via simultaneous, sequential or combinations of simultaneous and sequential measurements, encrypt the biometric data and provide the data to the user authentication controller 36. In this manner, an unprecedented simplification of identification, authorization and context aware authorization is provided. Optionally, the manner in which a user 60 holds a device 10, or more particularly, a user's unique behavioral traits, are tangible metrics which can be measured according to haptic-based biometric sensory inputs 38, and subsequently transmitted to user authentication controller 36.

User authentication controller 36 is equipped with a persistent storage device 40 having a software authentication program or programs 42, and the previously stored registered haptic-based biometric signature 50 of a registered owner(s) and/or user(s) depending on how the device 10 has been configured, and which user's data has been stored therein. In exemplary embodiments, the storage device may include internal hard drives, solid state memory devices, RAM, expandable memory slots, such as SD cards, external hard drives, network-based storage, and cloud-based storage.

User authentication controller 36 is capable of receiving multiple sets of data, i.e. biometric input, via simultaneous, sequential or combinations of simultaneous and sequential measurements from haptic-based biometric sensory inputs 38 and the various other non-biometric sensors, for comparison and analysis. It is the creation of, and subsequent comparison to, a registered haptic-based biometric signature 50, via the haptic identification system 12, which accounts for the unique tendencies and qualities of an individual user that provides the novel level of protection in the user authentication controller 36.

In the present exemplary embodiment, the system and method according to the inventive concept provides for the ability to use the biometric sensors and/or non-biometric sensors to assess a context of a situation in which a user is attempting to access a device and react accordingly. For instance, a user may create a biometric and/or non-biometric signature of the manner in which he/she uses a particular device, such as a mobile phone, or enters a password or phrase. The user's signature may include data received from the biometric sensors and/or the non-biometric sensors while the user enters a password or phrase, or while the user merely uses the device. The system and method may then compare data received from the biometric and/or non-biometric sensors obtained while the user subsequently enters a password or a phrase or uses the device with the biometric and/or non-biometric data recorded while the user created the user signature.

In exemplary embodiments, the data received from the biometric and/or non-biometric sensors may be analyzed to determine whether the user is experiencing stress or is under duress while attempting to access a device. The system and method may deny access to the device if determined that the user's biometric and/or non-biometric sensor data is different than the signature, or the user is outside a predetermined geographical location. For instance, the system and method may be defined so as to allow the user access to a device while at a workplace environment and deny the user access to the device while outside of the workplace environment.

In exemplary embodiments, the user's signature (i.e., first data inputs) are sent to a statistical classifier. The statistical classifier computes a biometric signature by calculating statistical variability within the user's signature input data that is unique to the user and then stores this as the user's biometric signature (i.e., registered haptic-based biometric signature) in a memory Further, the second data inputs (i.e., biometric input data) entered by a potential user is initially treated as an imposter and may also be sent to the statistical classifier to have biometric signature of the potential user calculated. In alternative exemplary embodiments, the user may have a plurality of user signatures based on a desired amount of data points.

In the present embodiment, both the first data inputs (i.e., registered haptic-based biometric signature) and the second data inputs (i.e., biometric input data) are transmitted to the authentication controller where, depending on a desired level of security and a corresponding false acceptance rate (FAR) and false rejection rate (FRR) that accompanies the desired level of security, the second data inputs (i.e., biometric input data) is compared to the first data inputs (i.e., registered haptic-based biometric signature), calculating a similarity between the two biometric signatures, and determines whether or not the input data originates from the same user.

For example, similarity is a measure of correspondence of the biometric data between the first and second inputs and may be represented as a distance or a match score between the data sets, wherein both distance and match scores can be appreciated to be measures that constitutes a probability that the second data inputs are from the same user that the first data inputs were from.

In exemplary embodiments, the value of the distance may fall between zero and an absolute maximum value (i.e. a distance of −5 and 5 are equivalent), where a distance of zero represents a high degree of correspondence, and therefore the second data inputs likely belong to the same user that created the first data inputs, and a distance closer to the maximum value represents a very low degree of correspondence.

With respect to a match score, the value may fall between zero and one, where zero constitutes a low correspondence and one constitutes a high level of correspondence. In either case of similarity measurement, the generated value must fall above or below a determined threshold value, where the threshold value is determined according to the FAR and FRR values determined according to the desired level of security. These comparison methods however make no predetermined assumptions as to the values of the input data or the biometric signatures, but instead uses the measured data values and calculated distances and match scores for the purpose of authentication. However, the present general inventive concept is not limited thereto. That is, in alternative exemplary embodiments, the present general inventive concept may include conventionally known methods of comparing and contrasting data sets.

Further, the system and method may deny the user access to the device if the user is determined to be under duress as evidenced by an increase in accelerometer activity caused by the user's hand shaking.

FIG. 2 is a sequence diagram illustrating a touch-enabled device 10 equipped with the haptic identification system 12 according to an exemplary embodiment of the present general inventive concept gathering a baseline, or first initial data set or sets of user-data for the creation of a registered haptic-based biometric signature 50. As illustrated in FIG. 2, an exemplary method to produce the registered haptic-based biometric signature 50 may include the CPU 28 prompting an event 29 comprising trial run or runs requiring a user 60 to undertake a certain action. Using the touch screen haptic interface 26, a user 60 will undertake the required action, such as a touch, swipe, choosing a pass-code, and/or some minimum action requiring tactile interaction with the haptic interface 26. Optionally, the minimum action could be with the device in general, as a user's unique behavioral traits, are tangible metrics which can be measured according to haptic-based biometric sensory inputs 38.

As a user 60 interacts with touch screen haptic interface 26, the haptic-based biometric sensory inputs 38 generate, track and record the sets of biometric input data via simultaneous, sequential or combinations of simultaneous and sequential measurements, which are subsequently transferred to the user authorization controller 36. User authorization controller 36 will utilize the provided biometric input data to create a registered haptic-based biometric signature 50 that is uniquely associated with the owner(s) and/or user(s) to be stored in its storage 40 for future comparison when anyone attempts to access the device 10.

User authorization controller 36 gathers the biometric input data via simultaneous, sequential or combinations of simultaneous and sequential measurements from the haptic-based biometric sensory inputs 38 produced by interaction with the touch screen haptic interface 26, or more generally, the device 10 as a whole, and thereafter produces a unique haptic-based biometric signature 50 of each authorized user via a secure means, that is used to determine boundaries in which future activation events are compared to in order for a user 60 to access the device 10. It can be appreciated that the secure means can consist of, but is not limited to, one or a combination of the following: a statistical means; software applications means; and algorithmic means. For example, the biometric input data of a user 60, i.e., the user's pulse, temperature, pressure with which they touch the screen 26, location of points on the screen 26 that are struck, is converted into digital form, via a software application, and, in turn, stored in the persistent storage component as that particular user's haptic-based biometric signature. However, the present general inventive concept is not limited thereto.

Furthermore, as it can be appreciated, more than one user, which can include different types of users with varying levels of access, for e.g., owner(s), registered users, known users, or guests can be programmed into the touch enabled device 10, via the haptic identification system 12, thus a multi-user scenario, which distinguishment between different users is possible. Once multiple users are registered in the storage 40 of the user authorization controller 36, the device 10 can be accessed and engaged by multiple users without taking secondary actions, such as shutdown or lock out mode.

In other words, normal usage of a device includes, but is not limited to, using one or more fingers to perform actions on a touch screen which are comprised of single, simultaneous, sequential or combinations of single, simultaneous, and sequential swiping across the touch screen, taping the screen, forming shapes, gestures, or patterns on the screen, and capturing rotational vector data recorded when the device is tilted from the accelerometer sensors.

FIG. 3 is a sequence diagram illustrating a touch-enabled device 10 equipped with the haptic identification system 12 according to an exemplary embodiment of the present general inventive concept requesting a user's authentication to access the device 10. As shown in FIG. 3, when any individual, including a user 60, attempts to access touch enabled device 10 which is equipped with haptic identification system 12, CPU 28 prompts an event 31, requesting that the user 60 provide authentication, and such a request is displayed on the touch screen user interface 26. Using the touch screen haptic interface 26, a user 60 will undertake the required action, such as a touch, swipe, choosing a pass-code, or a verification means consistent with Lock Pattern technology. As a user 60 interacts with touch screen haptic interface 26, the haptic-based biometric sensory inputs 38 generate, track and record the sets of biometric input data, which are concurrently encrypted, and subsequently transferred to the user authorization controller 36.

The captured data 44 sets sent from the haptic-based biometric sensory inputs 38 are compared, via authentication program 70 to the previously registered haptic-based biometric signature 50, by for e.g., preferably statistical means and/or an algorithm. A pre-determined statistical means and/or an algorithm determines whether the user's 60 current captured data falls within an acceptable threshold 52, or range of acceptable error. If acceptable, haptic identification system 12 will take subsequent authorization steps, and report a match 78 to the CPU 28 allowing a user 60 to access the device. If unacceptable, a non-match 80 is reported and the haptic identification system 12 will take secondary measures 82.

As it can be appreciated, in one embodiment, the means of comparing the captured biometric input data to the registered haptic-based biometric signature 50 consists of the cryptographic encryption of the registered haptic-based biometric signature 50 via a one-way cryptographic hash function, transforming the biometric input data to a fix-sized bit string, or hash value. As a user engages the device and biometric input data is captured in real time, it is converted via the cryptographic hash function to a hash value, thereby compared to the hash value of the registered haptic-based biometric signature 50 and must fall within a range of irreversible hash value to be acceptable. The means of comparison can vary and is not limited to the above.

Secondary measures 82 can include, but are not limited to, a question prompt to authenticate the user 60, a return to the user authentication screen, a device shutdown, or an alert of a user or a third-party that an unauthorized user is attempting to access the device 10.

As it can be appreciated, the haptic identification 12 may be provided with override functions or be equipped to undertake certain actions even by an unauthorized user. For example, in the event of an emergency, an unauthorized user may be able to dial 911. Haptic identification system 12 can handle scenarios where a login is not required but security protection remains paramount. For example, haptic identification system 12 may enable a user 60 or users to access the device 10 without a prompted authentication, however, only limiting the access to a permissible list of restricted functions or areas within the device 10. As a user 60 or users interacts with the device 10, and it is determined, via the comparison of captured biometric input to the registered haptic-based biometric signature 50, that a user 60 is so authorized, access to further functions and areas of the device 10 become unlocked gradually.

FIG. 4 is a sequence diagram illustrating a touch-enabled device 10 equipped with the haptic identification system 12 according to an exemplary embodiment of the present general inventive concept, request of a user's authentication following a user's attempt to access a protected area of a touch-enabled device 10. As shown in FIG. 4, not only is general access to the device 10 protectable, but haptic identification system 12 is capable of protecting access to systems, applications, or information within the device 10. This form of protection offered by the haptic identification system 12 can function as a prompt from the CPU 28, requiring entry verification input by a user 60 in the exact same manner as described above in FIG. 3, or can simply run in the background, as the user's current biometric input data is continuously monitored and compared with the registered haptic-based biometric signature 50. Thus, haptic identification system 12 enables the device 10 to record the series of actions or events that take place and tie them back with reasonable confidence to the registered user 60 or owner, without having to constantly prompt a pass code or entry verification.

Device 10 equipped with the haptic identification system 12 can determine from biometric cues, i.e., biometric input data, measurable by instrumentation via simultaneous, sequential or combinations of simultaneous and sequential measurements from haptic-based biometric sensory inputs 38 found on the device 10 to determine if the state of a user 60 for the purposes of making context aware authorization decisions and grants of access or levels of access to information, network/data connections, files, images and the like. Such contexts may include but are not limited "known user under normal circumstances"; "known user under duress"; "known user under elevated stress"; "unknown user under normal circumstances"; "unknown user under duress"; "unknown user under elevated stress"; etc. Therefore, a haptic-based biometric sensory input 38, such a pulse oximeter, temperature gauge, or accelerometer provides a series of measurements from a user 60, which is thereafter compared against the haptic-based biometric signature 50 of the user 60 which would reflect the levels at a normal state, and thereby determines if the user 60 is under duress, or some other pre-determined state. Secondary measures can thereafter be implemented once such a determination is made.

The background feature, which provides an invisibility factor, allows for uninterrupted enjoyment of a device by an authorized user. Concurrently, this feature can track an unauthorized user should force or duress means be applied to an owner or user of a device, without alerting the individual applying the duress, but promptly notifying other third parties such as the police.

It can be appreciated that the haptic identification system 12 can trigger the use of non-haptic interface sensors such as light sensors, cameras, audio/video recording interfaces, on the device due to the direct link with the CPU 28 to work in concert with the system 12. The non-haptic interface sensors can supplement haptic identification system 12 to further provide for an unprecedented simplification of identification, authorization and context aware authorization of a user 60.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet).

It is to be understood that the foregoing illustrative exemplary embodiments have been provided merely for the purpose of explanation and are in no way to be construed as limiting of the present general inventive concept. Words used herein are words of description and illustration, rather than words of limitation. In addition, the advantages and/or utilities described herein may not be realized by each and every exemplary embodiment practicing the present general inventive concept. Further, although the present general inventive concept has been described herein with reference to particular structure, steps and/or exemplary embodiments, the present general inventive concept is not intended to be limited to the particulars disclosed herein. Rather, the present general inventive concept extends to all functionally equivalent structures, methods and uses, such as are within the scope of the appended claims. Those skilled in the art, having the benefit of the teachings of this specification, may affect numerous modifications thereto and changes may be made without departing from the scope and spirit of the present general inventive concept.

What is claimed is:

1. A method of authenticating a user, the method comprising:
   receiving a first data corresponding to a manner in which the user uses a first device;
   comparing a second data inputted on the first device by the user with the first data; and
   continuously monitoring the user to determine whether the second data is similar to the first data,
   wherein the first data corresponds to biometric input data corresponding to the user's unique usage of the first device, the biometric input data including rhythm/cadence data and contact area data.

2. The method of claim 1, wherein the biometric input data further includes at least one of body temperature data, pressure data, time data, capacitance data, and geographic CPS data.

3. The method of claim 1, wherein the first device includes a means to receive sensory input data.

4. The method of claim 1, wherein the second data corresponds to a manner in which the user uses the first device.

5. The method of claim 1, wherein the user can access the first device if authorized.

6. The method of claim 1, wherein the user may access a second device if authorized, if the second device inherits the authentication from the first device.

7. The method of claim 1, wherein the first device includes a touch screen device, a tablet, a smart phone device, a computer, and a network.

8. The method of claim 1, wherein the first data includes device usage information or sensory input data.

9. The method of claim 1, wherein the second data includes a password, a phrase, or normal device usage mannerisms.

10. A haptic-based identification, authentication, authorization, and context aware authorization system usable with a touch-enabled device having a touch screen haptic interface, touch-enabled device receiving a plurality of inputs during interaction with a user, the system comprising:
   a storage space to store a first plurality of inputs corresponding to traits of an authenticated user; and
   a central processing unit (CPU) in communication with the storage space and the touch-enabled device to continuously compare the first plurality of inputs with a second plurality of inputs inputted by the user,
   wherein the CPU continuously monitors the user's biometric input data from the touch-enabled device to determine whether the inputted second plurality of inputs is similar to the first plurality of inputs to authenticate the user, and
   wherein the biometric input data corresponds to the user's unique usage of the touch-enable device and is a combination of rhythm/cadence data and contact area data.

11. The system of claim 10, wherein the plurality of inputs further include data received from non-biometric sensors and wherein the CPU authorizes the user depending on a comparison of the first plurality of inputs with the second plurality of inputs.

12. The system of claim 11, wherein the CPU continuously monitors at least one of body temperature data, pressure data, time data, capacitance data, geographic GPS data, and device position data to determine whether to allow access to the touch-enabled device.

13. The system of claim 10, wherein the first and second plurality of inputs include biometric input data and sensory input data.

14. The system of claim 13, wherein the first and second plurality of inputs include biometric input data inputted by the authenticated user during interaction with the touch-enabled device.

15. The system of claim 14, wherein the first and second plurality of inputs comprise simultaneous, sequential or combinations of simultaneous and sequential measurements from the haptic-based biometric sensory inputs or the sensory input data.

16. The system of claim 15, wherein the biometric input data comprises body temperature data, pressure data, time data, capacitance data, rhythm/cadence data of finger press, accelerometer data, geographic GPS data, and device position data.

17. The system of claim 16, wherein the biometric input data comprises a user's physiological state.

18. The system of claim 17, wherein the CPU authorizes the user if the second plurality of inputs is similar to the first plurality of inputs and authorizes the user access to the touch-enabled device according to a degree of similarity between the first and second plurality of inputs.

19. A haptic-based identification, authentication, authorization, and context aware authorization system to be implemented on a touch-enabled device, comprising:
   a touch screen haptic interface, the touch screen haptic interface having means for providing various sensory inputs corresponding to the user's traits during interaction with a user;
   a central processing unit having means for communication with the haptic interface, the sensory inputs having means for continuously obtaining and transmitting the user's biometric input data and unique behavioral traits sensed during interaction with the user;
   a user authentication controller having means for continuously receiving, storing, and analyzing sets of the biometric input data during interaction with the user;
   means for transmitting the biometric input data to the user authentication controller,
   means for creating a registered haptic-based biometric signature based upon an authenticated user's biometric input data; and
   means for continuously comparing the biometric input data to the registered haptic-based biometric signature,
   wherein the touch enabled device is programmed to undertake actions based upon the results of the comparison between the biometric input data to the registered haptic-based biometric signature and,
   wherein the biometric input data corresponds to the user's unique usage of the touch screen haptic interface and is rhythm/cadence data.

20. The system of claim 19, wherein the biometric input data includes one or more of body temperature data, pressure data, time data, capacitance data, geographic GPS data, and device position data.

21. The identification, authentication, authorization, and context aware authorization system according to claim 19, wherein the sensory inputs comprise haptic-based biometric sensory inputs.

22. The identification, authentication, authorization, and context aware authorization system according to claim 19, wherein the authentication controller provides a plurality of levels of access to the touch enabled device based upon the comparison between the biometric input data to the registered haptic-based biometric signature.

23. The identification, authentication, authorization, and context aware authorization system according to claim 19, wherein the data sets comprise simultaneous, sequential or combinations of simultaneous and sequential measurements from the haptic-based biometric sensory inputs.

24. The identification, authentication, authorization, and context aware authorization system according to claim 19, wherein the biometric input data comprises body temperature data, pressure data, time data, capacitance data, rhythm/cadence data of finger press, accelerometer data, geographic GPS data, device position data, and contact area data.

25. The identification, authentication, authorization, and context aware authorization system according to claim 24, wherein the biometric input data comprises a user's physiological state.

26. The identification, authentication, authorization, and context aware authorization system according to claim 22, wherein the authentication controller provides a first level of access to the touch enabled device if the user's physiological state data within the biometric input data is similar to the user's physiological state data within the registered haptic-based biometric signature.

27. The identification, authentication, authorization, and context aware authorization system according to claim 26, wherein the authentication controller provides a second level of access to the touch enabled device if the user's physiological state data within the biometric input data is different than the user's physiological state data within the registered haptic-based biometric signature.

28. The identification, authentication, authorization, and context aware authorization system according to claim 24, wherein the authentication controller provides a first level of access to the touch enabled device if the user is within a predefined region based on the GPS data.

29. The identification, authentication, authorization, and context aware authorization system according to claim 28, wherein the authentication controller provides a second level of access to the touch enabled device if the user is outside the predefined region based on the GPS data.

30. A method of determining an authorization of a user in real-time, the method comprising:

receiving a first data corresponding to a manner in which a first user uses a first device;
storing the first data in a data storage device;
allowing a user to operate the first device;
receiving a second data corresponding to a manner in which the user operates the first device unique to the user;
validating the user when the second data is biometrically equal to the first data;
determining a state of the user based on haptic based inputs received from the first device, the state including a normal state and an abnormal state; and
allowing the user to access the first device when validated and determined to be in the normal state.

31. The method of claim 30, wherein the haptic based inputs include a pulse oximeter, a temperature gauge, and an accelerometer.

32. The method of claim 31, wherein the normal state is defined based on normal state data received from at least one of the haptic based inputs from the first user under normal circumstances.

33. The method of claim 32, wherein an abnormal state is determined when data received from the same haptic based inputs used to define the normal state is different than the normal state data.

34. The method of claim 30, further comprising continuously validating whether the second data corresponding to the user is biometrically equal to the first data.

* * * * *